United States Patent [19]

Silberschlag

[11] 4,305,493
[45] Dec. 15, 1981

[54] FRICTION SHOE ASSEMBLY FOR A SPEED RESPONSIVE CENTRIFUGAL CLUTCH ASSEMBLY

[75] Inventor: Russell E. Silberschlag, Glen Ellyn, Ill.

[73] Assignee: Borg-Warner Corporation, Chicago, Ill.

[21] Appl. No.: 106,594

[22] Filed: Dec. 26, 1979

[51] Int. Cl.³ .............................................. F16D 43/14
[52] U.S. Cl. ...................... 192/105 BA; 192/105 CE; 192/3.31
[58] Field of Search ........... 192/3.31, 105 BA, 103 B, 192/105 CE, 75, 76

[56] References Cited

U.S. PATENT DOCUMENTS

| | | |
|---|---|---|
| 2,400,585 | 5/1946 | Wolff . |
| 2,429,697 | 10/1947 | Rawson . |
| 2,626,033 | 1/1953 | Lewis et al. . |
| 2,691,437 | 10/1954 | Dalrymple . |
| 3,025,939 | 3/1962 | Moule et al. . |
| 4,140,210 | 2/1979 | Schulz . |
| 4,226,309 | 10/1980 | Silberschlag ................ 192/105 CE |

FOREIGN PATENT DOCUMENTS 523906  4/1956  Canada .

Primary Examiner—George H. Krizmanich
Attorney, Agent, or Firm—James A. Geppert

[57] ABSTRACT

A friction shoe assembly for a speed responsive centrifugal clutch assembly especially adapted for use as a lock-up clutch in connection with a torque converter, which shoe assembly includes a centrifugally-actuated follower, load limit spring and stop, and a retractor spring in combination with a centrifugally engageable friction shoe, providing for low speed lock-up while limiting the torque capacity of the lock-up clutch at higher speeds.

6 Claims, 9 Drawing Figures

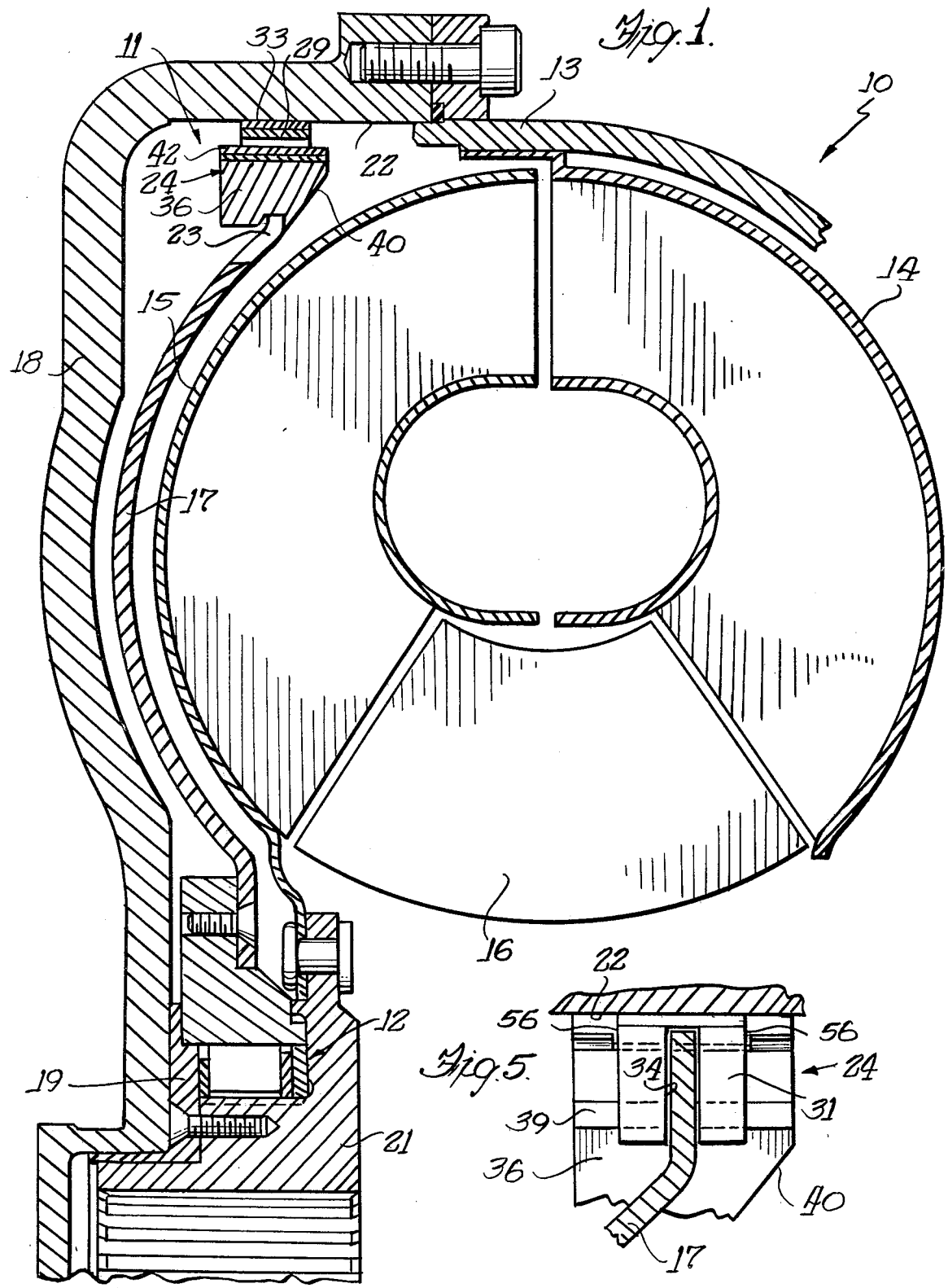

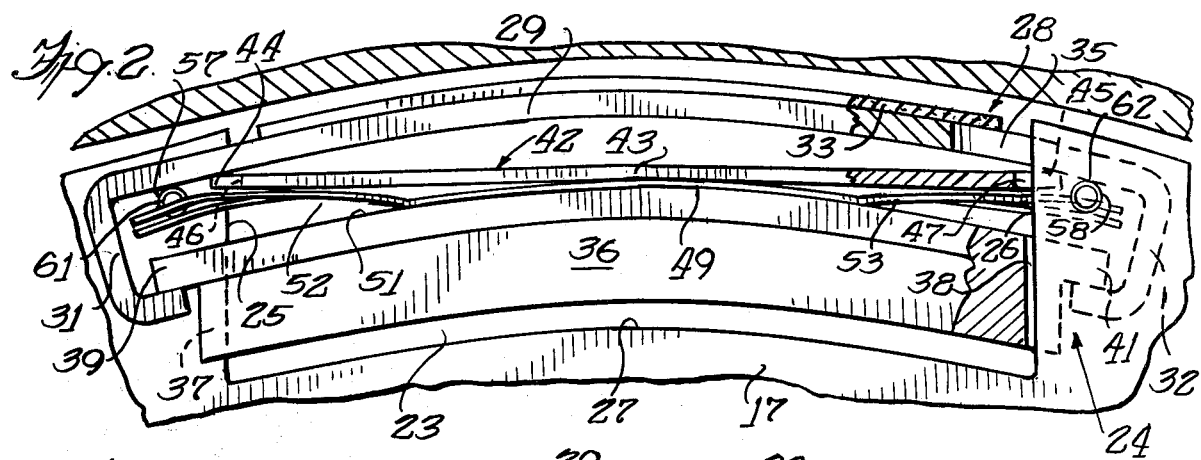
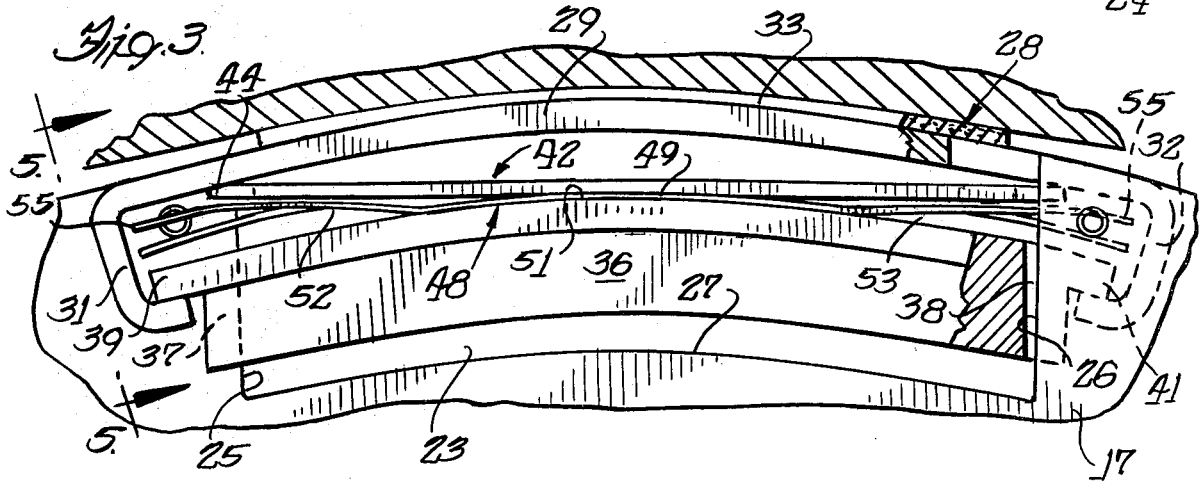
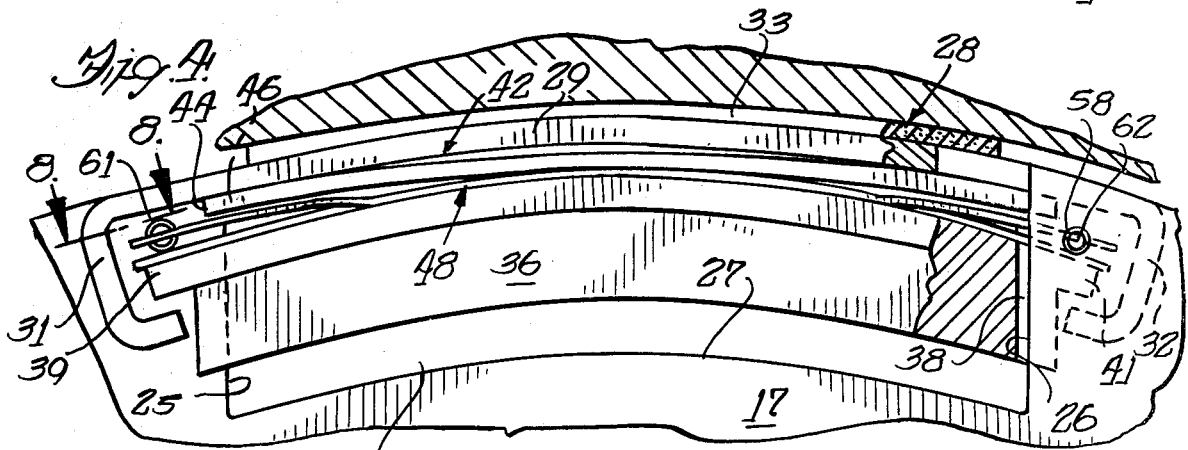
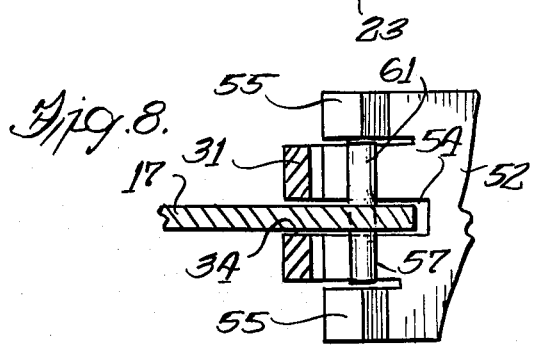
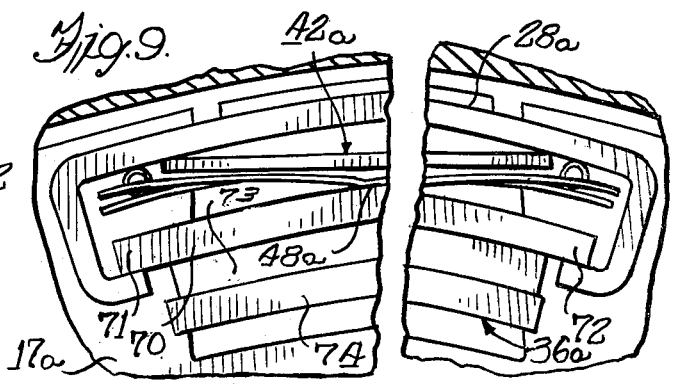

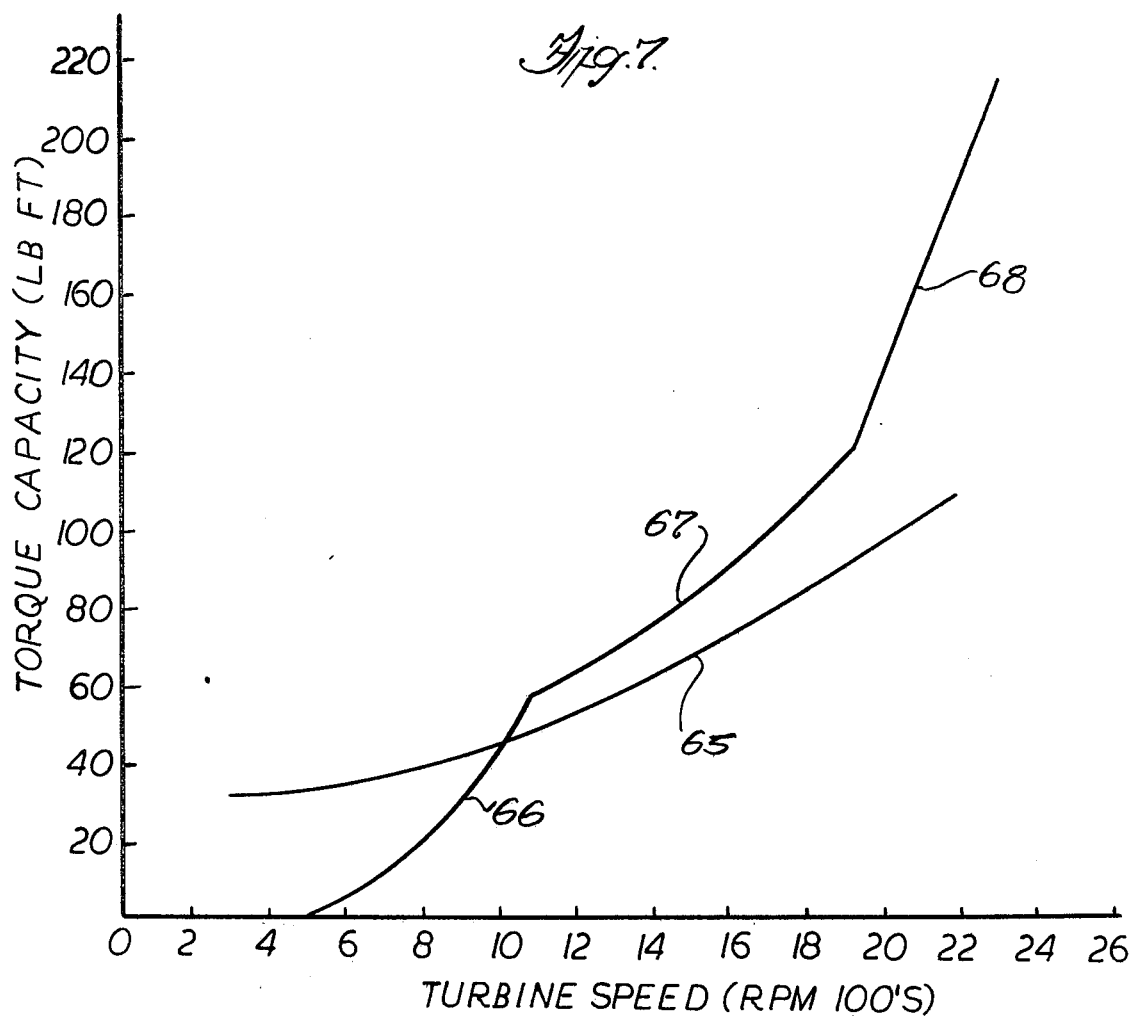
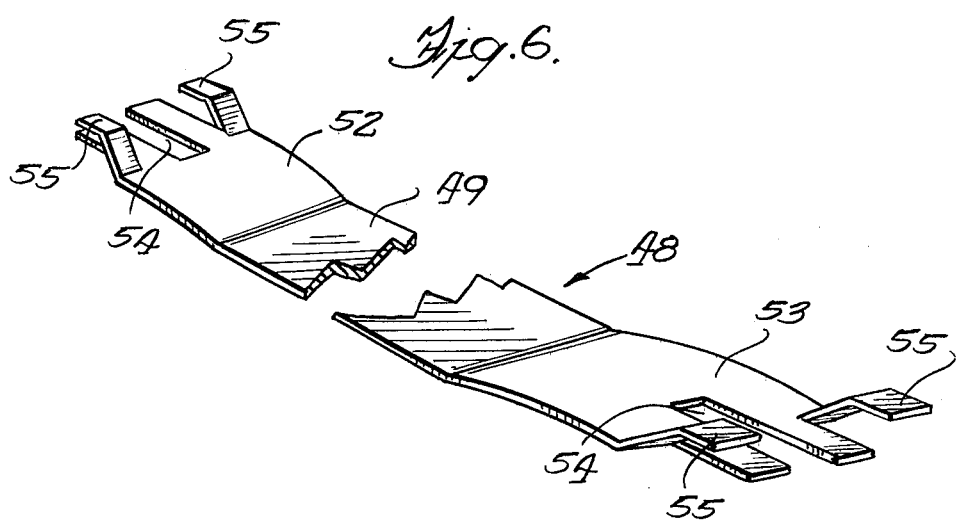

FRICTION SHOE ASSEMBLY FOR A SPEED RESPONSIVE CENTRIFUGAL CLUTCH ASSEMBLY

BACKGROUND OF THE INVENTION

The present invention relates generally to speed responsive couplings and more particularly to friction shoe assemblies for use in centrifugally engaging friction clutches having limited torque transmitting capability. It has been found desirable to provide a lock-up clutch between the impeller and turbine of a fluid torque converter capable of connecting the impeller and turbine together under selected operating conditions and capable of releasing the impeller and turbine for relative rotation under other operating conditions. It has further been found desirable to provide a friction clutch which is capable of engagement at low rotational speeds, but capable of slipping at higher speed with increases in torque above the design level.

In the prior art it has been proposed to provide a centrifugally-actuated friction shoe in combination with a resiliently deflectable wedging ramp wherein the engaging force of the shoe with a drive surface, and therefore the torque capacity of the clutch, is determined by a combination of the mass of the shoes, the speed of rotation, the angle of the wedging ramp, the coefficients of friction, and the resiliency of the wedging ramp. In order to achieve rotational balance of a rotatable assembly, it is desirable to provide a plurality of friction shoe assemblies spaced circumferentially about the rotatable member. It has also been found that variations in the dimensional tolerance of ramp angles result in unequal distribution of torque capacity among the several shoes.

The present invention provides a friction shoe assembly for a speed responsive friction clutch that overcomes the disadvantages of previously known centrifugally-actuated couplings.

SUMMARY OF THE INVENTION

The present invention is directed to improvements in speed responsive couplings and more particularly to friction shoe assemblies for centrifugally actuated friction clutches capable of engagement at low speeds and having limited torque capacity at higher speeds. The present invention contemplates the use of a primary or friction shoe, which may be light in weight, and which is subjected to centrifugal engaging forces throughout the operating speed range of the device, in combination with an auxiliary or follower member, which may be heavy and of greater mass than the friction shoe, and which is centrifugally operative for contributing to the engaging force of the shoe in a selected low speed range of the device and which is prevented from contributing further increases of engaging force with increasing speed of the device above a selected speed. Where a plurality of shoes are employed, the masses of the several shoes become the principal determining factor in the sharing of torque capacity at speeds of rotation above the selected speed.

The coupling of the present invention is advantageously employed for connecting the impeller and turbine of a fluid torque converter together at low speeds of rotation while permitting slip to occur under certain higher speed operating conditions. When used with a fluid torque converter in a motor vehicle, the coupling of the present invention promotes low speed fuel economy while permitting smoother higher speed shifts and further reduces fuel consumption and torsional vibration when the vehicle is coasting due to the use of a one way clutch.

The present invention also comprehends the provision of an improved friction shoe assembly utilized in a speed responsive centrifugal clutch, wherein each shoe assembly includes a friction shoe, a follower member, a yieldable load limiting spring, and a retraction spring where the load limiting spring and retraction spring are both operatively positioned between the friction shoe and the follower member. The friction shoe assembly is less expensive, chamfer free and is simpler to assemble than prior structures. The friction shoe assembly is solely held together by spring pressure and is adapted to be received in a substantially straight-sided notch in a rotatable disc. The disc assembly accommodates longer friction shoes to enhance the lock-up capabilities, and the retraction spring is provided with constant spring lever arms for positive retracting action of the assembly.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a partial cross sectional view taken through a portion of a torque converter showing the friction shoe assembly of the present invention connected in a speed responsive coupling.

FIG. 2 is a side elevational view partially in cross section showing the friction shoe assembly in its retracted position.

FIG. 3 is a side elevational view similar to FIG. 2, but showing the friction shoe assembly in an engaged low speed operating position.

FIG. 4 is a side elevational view similar to FIG. 2, but showing the friction shoe assembly in an engaged high speed operating position.

FIG. 5 is an end elevational view of the friction shoe assembly taken on the line 5—5 of FIG. 3 in the direction of the arrows.

FIG. 6 is a partial perspective view of the retractor spring for the friction shoe assembly.

FIG. 7 is a chart showing torque capacity of the speed responsive coupling according to the present invention compared to the torque required to drive a vehicle on a level road.

FIG. 8 is a fragmentary cross sectional view taken on the line 8—8 of FIG. 4.

FIG. 9 is a partial side elevational view of an alternate embodiment of friction shoe assembly.

DESCRIPTION OF THE PREFERRED EMBODIMENTS

Referring now in more detail to the drawings, a portion of a fluid torque converter 10 is shown in FIG. 1 equipped with a speed responsive lock-up coupling 11, and provided with an overrunning clutch 12. The torque converter includes a first rotatable member or housing 13 mounted for rotation about the axis of rotation of the transmission input shaft (not shown). The rotatable housing 13 is connected to an impeller section 14 of the fluid torque converter; the converter also having a turbine section 15 and a stator section 16 disposed adjacent to each other.

A second rotatable member or disc 17 is disposed between a wall 18 of first rotatable member 13 and turbine 15 and is mounted on a bearing member 19 for rotation about the input shaft axis coaxially with the first rotatable member 13.

A third rotatable member or turbine hub 21 is secured to the turbine section 15 and is mounted for rotation about the input shaft axis coaxially with the first and second rotatable members 13 and 17. The overrunning clutch 12 is connected between second rotatable member or disc 17 and third rotatable member or turbine hub 21 permitting the hub to turn faster than the disc 17.

The first rotatable member or housing 13 is normally connected to a source of power such as the engine of a motor vehicle while the third rotatable member or turbine hub 21 is normally connected to powered apparatus such as the drive line of a motor vehicle through a splined connection to the transmission input shaft. Second rotatable member or disc 17 is enclosed in the oil filled coverter housing 13 and is caused to rotate by means of the oil movement in the housing. When operating in a torque multiplication or slip mode, the turbine hub 21 rotates slower than the first rotatable input member or housing 13.

The housing 13 includes a circumferentially extending drive surface 22 which is engageable by the speed responsive drive coupling 11 providing a frictional coupling between the housing 13 and the disc 17. The disc 17 is provided with a circumferential series of openings or notches 23, each containing a friction shoe assembly 24; one of the notches and shoe assemblies being shown in more detail in FIGS. 2–4.

A notch 23 in the disc 17 is defined by the edge surfaces 25,26 and 27 (see FIGS. 2, 3 and 4); the edge surfaces or guide means 25 and 26 defining substantially parallel straight edges connected by the arcuate base edge 27 and serving to guide the radial movement of the shoes in the lock-up coupling 11.

The centrifugally actuatable friction shoe assembly 24 includes a friction shoe 28 formed of a bowed portion 29 and a pair of spaced C-shaped end portions 31,32 formed downwardly and inwardly. A friction facing material 33 is secured to bowed portion 29. Each of end portions 31,32 is slotted as at 34,35 to provide a end portions 31,32 is slotted as at 34,35 to provide a channel for embracing a respective one of the guide edges 25 or 26.

An auxiliary loading means is provided including a bowed unitary follower member 36 formed of a relatively heavy material and slotted at 37 and 38 at the ends for embracing guide edges 25 and 26. Opposite end portions or flanges 39 and 41 of follower member 36 are received within the respective C-shaped end portions 31 and 32 of friction shoe 28, and the follower member has a beveled surface 40 (FIG. 1) for accommodation in the space ajdacent the turbine section 15. A yieldable load limiting leaf spring 42 is positioned between the friction shoe 28 and the follower member 36 having its mid-portion 43 bearing against the follower member and its end portions 44,45 bearing against the underside of the friction shoe. The end portions are slotted at 46,47.

Also, a retractor spring 48 is positioned between the leaf spring 42 and the follower member 36 and has an arcuate mid portion 49 of the same curvature as and engaging along the upper bowed surface 51 of the follower member 36 and a pair of opposite lever arm portions 52 and 53. Each arm terminates in a central slot 54, adapted to be aligned with the slots 34, 35 of the friction shoe 28, slots 37,38 of the follower member 36, and slots 46,47 of the leaf spring. Also, a pair of upwardly and outwardly bent ears 55 are formed on the corners of the end of each arm portion 52 spaced apart a distance to retain pin 61 in its location in disc 17.

The second rotatable member or disc 17 includes a pair of spaced openings 57,58 adjacent guide edges 25,26. A pair of pins 61,62 are mounted in the openings 57,58 forming stop means limiting outward movement of follower member 36 and inward movement of shoe 28. The upturned ends or ears 55 of retractor spring 46 are positioned to abut the outer ends of the pins 61,62 to retain the pins in operative position.

To assemble the lock-up coupling 11, the friction shoe assembly 24 has the follower 36, leaf spring 42 and retractor spring 48 inserted into the shoe 28 with the ends of the follower, leaf spring and retractor spring received in the C-shaped end portions 31,32. With the slots 34,35 of the friction shoe 28, the slots 37,38 of the follower 36, the slots 46,47 of leaf spring 42 and the slots 54 of the retractor spring 48 aligned, the shoe assembly 24 is slid inwardly as a unit into one of the straight-sided notches 23 in the second rotatable member or disc 17, with the guide edges 25,26 received in the aligned slots. Then the ears 55 of the spring 48 are depressed and the pins 61,62 are inserted into the openings 57,58 and the ears released to retain the pins in proper position. The friction shoe assembly 24 is now located in operative position in the disc 17 with the beveled surface 40 adjacent the shell of the turbine 15. Likewise, each of the other notches on the periphery of the disc receives an identical friction shoe assembly 24.

Referring now to FIG. 7, the curve 65 represents the torque transmitted by the third rotatable member or turbine hub 21 plotted as a function of speed of rotation and may be viewed as equivalent to a road-load torque curve of a motor vehicle when operating in drive ratio at steady state. The curve portions 66,67 and 68 represent the torque transmitting capacity of the friction shoes 28 in contact with drive surface 22 plotted as a function of speed of rotation of disc 17.

Referring now to FIGS. 2–5 as well as FIG. 7, the shoe 28, load spring 42 and follower 36 of each assembly 24 remain in the retracted position under the influence of retractor spring 48 acting on the stop pins 61,62 as shown in FIG. 2 below 500 rpm for the disc 17 in a typical design, and the torque converter operates in a conventional manner. At approximately 500 rpm, centrifugal force is high enough that the retractor spring 48 yields to permit the shoe 28, load spring 42 and follower 36 to move radially outwardly in the associated notch 23 until shoe 28 engages drive surface 22 as shown in FIG. 3. Between approximately 500 rpm and 1100 rpm, the shoe acts to compress the friction material 33 and the load spring and follower continue to act as a unit with the load spring deflecting and the follower moving radially outwardly from the position shown in FIG. 3 to the position shown in FIG. 4, the lever arm portions 52,53 of spring 48 yielding for this movement. During transition from the position of FIG. 3 to the position of FIG. 4; the mass of shoe 28, spring 42 and follower 36 act in concert with increasing speed of rotation to increase engaging pressure between shoe 28 and surface 22 resulting in a torque capacity represented by curve portion 66. Over this curve, follower 36 moves outwardly relative to shoe 28, flexing spring 42 which transmits the centrifugal force of follower 36 to shoe 28.

Upon reaching a speed of approximately 1100 rpm, the follower 36 has moved so that the flanges 39,41 engage the pins 61,62, and further outward movement of follower 36 is prohibited. The spring 42 thus remains flexed at a position equivalent to a speed of 1100 rpm until a speed of approximately 2000 rpm is reached. Between the speeds of 1100 and 2000 rpm, the engaging force between the shoe 28 and surface 22 is determined by the mass of the shoe 28 and the load spring 42 acting centrifugally in response to the speed of rotation augmented by the flexure of spring 42. The corresponding torque capability is represented by curve portion 67.

At speeds above approximately 2000 rpm, the centrifugal force acting on spring 42 causes it to bow outwardly out of contact with follower 36. Thus, above approximately 2000 rpm, the engaging force between shoe 28 and surface 22 is determined solely by the mass of shoe 28 and the mass of spring 42 acting centrifugally with further increases in speed of rotation. The torque transmitting characteristics above approximately 2000 rpm is represented by curve portion 68 with a limited torque capacity so that the friction shoes may be permitted to slip at these higher speeds when input torque is greater than the torque capacity of the shoes.

Also, when the speed decreases upon deceleration of the vehicle due to removal of the operator's foot from the accelerator pedal, the housing 13 and impeller 14 decrease in speed and, as the turbine 15 will then be rotating at a greater speed, the overrunning clutch 12 disengages to allow the slowing of the disc 17 which results in disengagement of the friction shoes 28 from the drive surface 22 when the speed drops below 500 rpm. Upon acceleration, the torque converter again operates normally until centrifugal force causes the friction shoes to reengage.

FIG. 9 discloses an alternate embodiment of friction shoe assembly wherein like parts will have the same reference numeral with the addition of a script a. The shoe assembly includes a friction shoe 28a, a yieldable load limiting spring 42a, a retractor spring 48a and a follower member 36a. However, the follower member is formed of several parts rather than the unitary member of FIGS. 1 through 6 and 8. The member 36a includes an upper bowed member 70 having oppositely extending flanges 71,72 fitting in the ends of the shoe 28a, an intermediate bowed member 73 which is shorter than member 70, and a lower bowed member 74 slightly longer than member 73. All of these members have central slots at the opposite ends to receive the straight edges of a slot in the rotatable disc 17a. Operation of this embodiment is identical to that of the embodiment of FIGS. 1–6 and 8 except that the three members move centrifugally outward together.

I claim:

1. A friction shoe assembly for use in a centrifugal clutch, comprising an arcuate friction shoe reciprocable between engaged and disengaged positions and terminating at each end in a downturned end portion having an inturned end to provide a C-shaped end having a central slot formed therein, a follower member reciprocable with and mounted for limited motion relative to said friction shoe, an elongated load spring comprising a substantially flat leaf spring with each end having a central slot and positioned between and yieldably engaging said friction shoe and follower member, said follower member having at least a slightly greater mass than said friction shoe and load spring, and a retractor spring positioned between said follower member and load spring and including an arcuate mid-portion engaging said follower member and opposite lever arm portions terminating in central slots with the outer ends of the arm portions having upwardly and outwardly bent ears at the corners thereof.

2. A friction shoe assembly as set forth in claim 1, in which said assembly is received in a notch formed in a rotatable disc having straight, generally parallel sides, said central slots in the ends of the friction shoe, load spring and retractor spring receiving the edges of said parallel sides therein.

3. A friction shoe assembly as set forth in claim 2, wherein said follower member has an arcuate body with a flange at each end received within the C-shaped end portion of said friction shoe, each end and flange of said follower member having a central slot therein receiving the edges of the parallel notch sides, said assembly being retained together solely by the force of said springs.

4. A friction shoe assembly as set forth in claim 1, in which said load spring has a mid-portion engaging said follower member and end portions engaging said friction shoe.

5. A friction shoe assembly as set forth in claim 1, wherein a pair of pins extend transversely through said disc adjacent the sides of a notch and said bent ears of said retractor spring cooperate with said pins to retract the assembly.

6. A friction shoe assembly as set forth in claim 1, in which said follower member is formed of at least two arcuate members, the outermost member being of a greater length to project into the ends of said friction shoe, all of said arcuate members being slotted at the opposite ends.

* * * * *